May 22, 1962
H. A. GOLLMAR
3,035,900
METHOD FOR THE SEPARATION AND RECOVERY OF H₂S
Filed Dec. 10, 1959
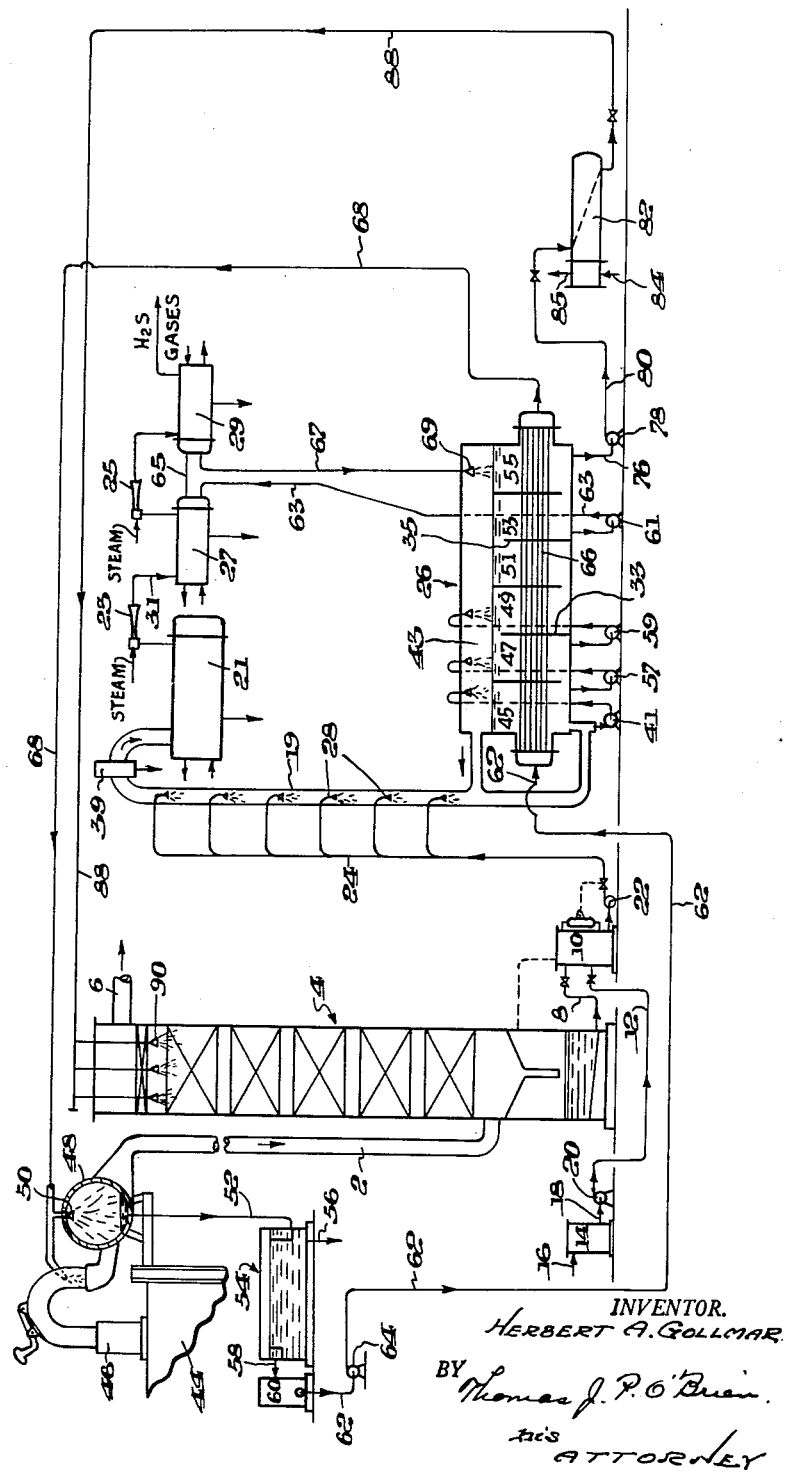
INVENTOR.
HERBERT A. GOLLMAR
BY Thomas J. P. O'Brien
his ATTORNEY United States Patent Office 3,035,900
Patented May 22, 1962

3,035,900
METHOD FOR THE SEPARATION AND
RECOVERY OF H₂S
Herbert A. Gollmar, Bethel Park, Pa., assignor to Koppers
Company, Inc., a corporation of Delaware
Filed Dec. 10, 1959, Ser. No. 858,806
3 Claims. (Cl. 23—181)

The present invention relates in general to improvements in the gas purification process as described in detail in Sperr Patent No. 1,533,773, issued April 14, 1925, for separation of acid gases, such as hydrogen sulphide, hydrogen cyanide, and carbon dioxide, from gases containing them, for example, coal carbonization gases, and more particularly, to improvements in the actification phase of such processes, and more especially, to such process as improved in the manner described in my Patent No. 2,464,805, issued March 22, 1949, wherein the waste heat of the flushing liquor from the collecting main of coke ovens is utilized as the source of heat for effecting the actification of the fouled liquor from the absorption step of the liquid purification of gas processes described in said Sperr method.

The primary object of the invention is to modify the process steps, and more particularly, those of the actification phase, in a manner to carry out the vaporization of the absorbed impurities with the evolution of smaller quantities of steam that must be condensed, and thereby reduce the size of equipment required for carrying out the process and thus decrease the cost of construction of the plant while still retaining the lower operating cost of such process and plant.

More specifically, the object of the invention is to modify the actification steps of such process in a manner such as to reduce the amount of heat transfer surface that is required to recover heat from the heating medium to heat the absorbent solution, and more particularly, the waste heat of the flushing liquor from the coke oven collecting mains, by making more efficient use of the vapors generated by such heat to regenerate the solution so that less vapor is required.

A particular advantage of the invention is that it eliminates the need for an actifier tower such as heretofore used in conjunction with the lower boiling section of the actification phase of such processes, and the reduction in quantity of vapors generated permits the use of much smaller equipment, such as the conventional vapor condenser, inter-condenser and after-condenser, as well as the jet evacuators commonly employed in such process.

The original process, as described in said Sperr Patent No. 1,533,773, had the advantage of very low construction costs, but had the disadvantage of rather high operating costs. The latter disadvantage was well eliminated by improvements such as those of my aforesaid Patent No. 2,464,805, but this improvement in lowering the cost of operation entailed an increase in the costs of construction, due to large amounts of steam vapors that had to be generated, to strip out the absorbed hydrogen from the solution before it could be returned to the absorption zone. These large amounts of vapors entailed the use of more costly large size condensers, etc.

The present invention retains the advantages of low cost of operation while attaining a substantial lowering of the cost of construction of the apparatus for carrying out the process, by respraying the fouled solution from the absorption stage into the overhead vapors from successive stages of boiling the fouled absorbent, to desorb the H₂S in the sprayed solution by the vapor and thereby reducing the amount of vapor and heat required to regenerate the solution and thus reducing the size of the condenser and eliminating the actifier tower.

Briefly stated, this is attained by passing the fouled solution successively through a plurality of boiling sections in the actification zone with a vapor off-flow free space above the liquor in each section, flowing the vapors from the vapor space above the liquor in each subsequent section through the vapor space in a next preceding section, and thence, passing them to a vapor condensing zone, introducing the fouled absorbent to the actification zone by first spraying the same into the vapors passing to the vapor condensing zone to release hydrogen sulphide, collecting said spray and respraying it directly into the vapor space above the liquor in the first section of the actification zone, withdrawing absorbent liquor from each of a plurality of the preceding sections and respraying it into the vapor space above the liquor in a next subsequent section, and withdrawing absorbent liquor from sections of the actification zone and flash evaporating such withdrawn liquor into the vapor space above the liquor in a subsequent section of the actification zone.

The passage of the foul solution through a plurality of sections of a boiling chamber, results in more efficient use of the heat than if only one large boiling section were used.

Advantageously, the flash solution is superheated by indirect heat exchange with steam used to produce the subatmospheric pressure on the solution so that about as much vapor is generated therefrom as is generated by boiling the fouled solution in the successive boiling sections.

In addition, sufficient solution is sprayed in the vapor spaces above the preceding boiling sections that flow of the solution directly across the barriers between the sections, is essentially zero, and the flow of solution from the absorption zone into the actification zone is effected by means of spaced sprays in the vapors passing to the vapor condensing zone.

Preferably, the heating medium for the boiling section is the collecting main flushing liquor of coke oven plants, as described in my aforesaid Patent No. 2,464,805. However, the process of the invention is not limited in all its aspects to this use of that liquor as the heating medium, since the process of the present invention is also applicable to use of low-pressure steam as the heating medium, as described in my Patent No. 2,842,423, and also to use with hot coke oven gas as the heating medium, as described in my Patent No. 2,379,076.

The various features of the invention are shown in the accompanying drawing which is illustrative only.

The single FIGURE is a flow diagram of the hot actification process and apparatus employing the sub-division of the boiling stage into sections with respraying the fouled solution into the vapors from the boiling sections above the same.

The hot-vacuum-actification process of separating acid gases from, for example, coke oven gases, comprises broadly absorbing the acid gases such as H₂S, HCN and CO₂, in an alkali metal carbonate solution in a scrubber, then heating the alkaline solution under a high vacuum in an actifier to drive the acid gases out of the absorption solution. At the same time, the absorption solution is regenerated so that the solution may be returned to the scrubber in a closed cycle.

An alkaline metal carbonate solution generally is employed to absorb the acid gases from the gas, and when the fouled solution is heated under a vacuum to remove the acid gases, a very large volume of water vapor is formed so that it is necessary to separate the water vapor from the acid gas before the acid gases can be further separated and refined. Since an alkaline metal carbonate solution normally is employed to absorb the acid gases from the fuel gas, the process has become known as the "vacuum carbonate process."

Referring to the figure of the drawing, coke-oven gas containing hydrogen sulphide flows through a pipe 2 into an absorber 4 and in which the said gas rises in counter-current contact with continuously descending absorbent, for example, an alkaline aqueous solution containing sodium carbonate and sodium acid carbonate.

The said sodium carbonate solution in the absorber 4 absorbs hydrogen sulphide and the other weakly acidic gases from the countercurrently flowing coke-oven gas. The so-treated coke-oven gas leaves the absorber at the top thereof and flows to additional apparatus of the by-product system through the pipe 6. Fouled absorbent solution flows from the bottom of the absorber 4, through a valved pipe 8, into a pumping tank 10, to which also is delivered through a valved pipe 12, freshly made up absorbent. The said made up absorbent is prepared in a mixing tank 14 into which is delivered water, and, for example, sodium carbonate through a pipe 16, for mixing therein. The fresh absorbent is pumped from the mixing tank 14 through a pipe 18 by pump 20 and through the said pipe 12 to the hereinbefore-mentioned pumping tank 10. Fouled absorbent from the pumping tank 10 is delivered by a pump 22 through a pipe 24 into vapor line 19 at a temperature usually about 112° F. between the boiling chamber 26 and the vapor condenser 21 and is distributed through nozzles 28 in a descending flow down through the vapor in the line 19 to use the vapor in that line to assist in the regeneration of the solution.

In the boiling chamber 26, the fouled solution is brought into indirect contact with hot flushing liquor from a coke-oven collecting main 48 which passes through a nest of submerged tubes 66. The heat of the flushing liquor, which enters the tubes 66 at about 163°–165° C., boils the solution in which they are immersed under vacuum equivalent to 2 inches to 6 inches of mercury absolute pressure at a temperature of 123° F. when the absolute pressure is 3 inches of mercury and drives some steam and hydrogen sulphide and other weakly acidic gases, overhead. From the boiling chamber 26, the actified absorbent is withdrawn from the bottom of the boiling chamber 26 through a pipe 76 and is pumped by pump 78 through a pipe 80 to a cooler 82 that is conventionally supplied with inlet and outlet cooling-water pipes 84 and 85, respectively. Cooled, actified absorbent is flowed from said cooler 82 through a valved pipe 88 to the top of the absorber 4, into which it is sprayed by nozzles 90 into said absorber 4.

Cooled flushing liquor is flowed from the tubes 66 at a temperature of 116°–118° F. through a pipe 68 to the nozzles 50 of the collecting main 48.

The flushing liquor so delivered to the collecting main 48 is thus cooler than in customary operation; and as a result thereof, a thinner tar is condensed in the main, making the cleaning of the main easier, and the gas is cooled to a greater degree than that obtained by customary operation, thereby relieving the load on the primary gas-coolers of a by-product plant.

Coke-oven gas flowing from a coke-oven battery 44 into the many standpipes 46, and thence into the collecting main 48, is cooled therein to 163°–165° F. by a spray of flushing liquor at 116°–118° F., from nozzle 50. The flushing liquor having been heated to 163°–165° F. by the hot gas in the collecting main 48, flows through a pipe 52 to a hot settling tank 54 in which tar which has been condensed therewith, is settled out and from which the tar is drained through a pipe 56. Flushing liquor is decanted from the hot settling tank 54 through a pipe 58 into hot flushing liquor pumping tank 60. The flushing liquor is pumped from the tank 60 through pipe 62 by a pump 64 back into the tubes 66 located in the boiling chamber 26.

In the actifying boiling chamber 26, the fouled liquor is heated, in accordance with the invention, under a high vacuum of approximately 2 inches to 6 inches of mercury absolute pressure to drive off the constituents absorbed in the alkaline liquor in the scrubber. The alkaline liquor flows horizontally in sections through the chamber 26 and is met with water vapors generated from the alkaline solution by heat applied to the solution in accordance with this invention, as will be subsequently described. The alkaline solution becomes revivified as it flows to the right end of the actifier 26 and revivified alkaline solution is drawn off through the line 76 to pump 78, and is then returned after being cooled in cooler 82 through line 88 and into distributor 90 in scrubber 4. Thus, the alkaline absorption solution is circulated in a closed cycle between the scrubber 4 and the actifier 26 in which the absorption solution is revivified.

In accordance with the process of my aforesaid Patent No. 2,842,423, steam jet evacuating means are provided to operate on the vapors leaving the actifier 26, thereby overcoming difficulties, due to hard polymer formation. Normally, to reduce the pressure from atmospheric to 2 inches to 6 inches mercury absolute, two stages comprising jet evacuators 23 and 25 and condensers 27 and 29, are employed. Actifier vapors from vapor condenser 21 are mixed with the operating steam of jet evacuator 23, while actifier vapors from intercondenser 27 are mixed with the operating steam of jet evacuator 25.

Part of the heat used in liberating hydrogen sulphide from the absorbent is derived from the steam-actifier vapor mixtures leaving the jet evacuating means 23, 25. As shown, steam-actifier vapors from jet evacuator 23, are withdrawn to inter-condenser 27, while steam-actifier vapors from jet evacuator 25 are withdrawn to after-condenser 29, to supply the heat to produce water vapor in the actifier.

One jet evacuating means can be used. Nevertheless, it will be more desirable to employ a plurality of jet evacuating means. According to one desirable method, the first jet evacuator 23 will be larger than the second jet evacuator 25. By this method, the vapors entering the second jet evacuator 25 from the larger first evacuator 23, whille be at a higher temperature than those from vapor condenser 21.

The actifier 26 is maintained under a vacuum of 2 inches to 6 inches Hg absolute by the jet evacuators 23 and 25. Vapors from actifier 26 leave the top of the actifier through line 19 and pass to a vapor condenser 21 at a temperature of 123° F. when the vacuum is 3.5 inches Hg absolute. This vapor condenser 21 is inserted between the first stage jet evacuator 23 and the actifier 26 because the actifier overhead contains large quantities of water vapor, for example, 50 mols of vapor to 1 mol of fixed gases. If this water vapor is not first condensed, say to 1 mol vapor to 1 mol of fixed gases, in vapor condenser 21, the amount of steam required in the first stage jet evacuator 23 would be greater than that needed in heating the actifier solution. In vapor condenser 21, the overhead gases are cooled from 120° F. at 3.5 inches Hg absolute to 100° F. at 3 inches Hg absolute.

Steam is injected into the first stage evacuator 23 at about 150 lbs. gauge and the steam-actifier vapor mixture leaving the jet 23 in line 31 enters inter-condenser 27 at 178° F. and 15.0 inches Hg absolute. It is seen that the pressure increase across the first stage jet evacuator is from 3 inches Hg to 15 inches Hg. In inter-condenser 27, the steam-actifier vapor mixture is cooled from 178° F. at 15.0 inches Hg to 155° F. at 14.8 inches Hg.

From inter-condenser 27, vapors pass to second stage jet evacuator 25 at a temperature of 155° F. at 14.8 inches Hg absolute. The temperature of the steam-actifier vapor mixture flowing from second stage jet evacuator 25 to after-condenser 29, is 216° F. at 34 inches Hg absolute. In after-condenser 29 the steam-actifier vapor mixture is cooled from 218° F. at 34 inches Hg to 160° F. at 33.5 inches Hg. The $H_2S$—HCN mixture is then passed from the after-condenser 27 through a moisture eliminator to recovery means such as a sulfuric acid plant or a flare stack, not shown.

In accordance with the present invention, the actifier boiling chamber 26 is sub-divided by vertical baffles 33, 35, that divide it into six sections—45, 47, 49, 51, 53, 55—from the flushing liquor inlet 62 to the flushing liquor outlet 68 at the right-hand end of the chamber 26. Alternate baffles 35 are at the same level a distance below the top of chamber 26 to leave an unobstructed vapor offflow space 43 above the fouled absorbent liquor during its flow through the six sections. These baffles 35 terminate above the base of the chamber 26 to allow the fouled liquor to flow across the baffles under the same to the next subsequent section. The intermediate baffles 33 all terminate at a lower level below the level of the top of the alternate baffles 35 to allow like flow across these baffles but over the same, and these baffles 33 extend to the base of the chamber to thus cause the liquid to flow in series through the six sections successively.

The vapors from the vapor space 43 above each subsequent section flows into the vapor space above the next preceding section, and all the vapors thus flow through the vertical vapor line 19 to the vapor condenser 21.

The entering fouled absorbent from line 24 is introduced into the actifier zone by first spraying it through a series of spray nozzles 28 in the vapor line 19 in which there is a high vapor velocity, between the actifier chamber 26 and the vapor condenser 21, thereby using the vapor line itself to assist in the regeneration of the solution. Some of the spray is carried by the vapors into a spray catcher 39 that drains to the pump 41, and the rest of the spray descends in the line 19 to the pump 41. The solution from the spray heads 28 that accumulates at the pump 41, is all resprayed into the vapor space 43 immediately over the bath in the first section. All of the solution from the first section 45 is withdrawn from the bottom thereof and resprayed by pump 57 into the overhead vapors in the vapor space 43 above the solution in the second section 47. All the solution in the second section 47 is likewise withdrawn from the bottom thereof and resprayed by pump 59 into the vapor in the vapor space 43 above the solution in the third section 49. All the solution from the third and fourth sections decant into the fourth and fifth sections 51 and 53. All the solution in the fifth section 53 is withdrawn by pumps 61 and circulated at 123° F. by line 63 into indirect heat exchange with the vapor and vacuum jet steam in the inter-condenser 27, and through line 65 again subjected to heat exchange with like vapor and steam in the after-condenser 29, whence the solution is returned by line 67 to spray heads 69 in the vapor space 43 above the solution in the last section 55. The solution from spray head 69 is above the normal boiling point at the vacuum inside the vapor space and is thus flash-evaporated in the vapors in that vapor space 43. Thus, the actified, or nearly actified, solution at the outlet end of the actifier is all flash-evaporated while heated to 154° F. by the heat obtained by condensing the jet steam. The vacuum inside the boiler chamber 26, causes an amount of water vapor to form, by flash-evaporation, that balances the amount of heat the solution absorbed in the jet condensers.

Most of the hydrogen sulphide is released to the vapors in the vapor space 43 above the first two sections 45, 47. Some, but not much, hydrogen sulphide is released in the subsequent sections 51, 53, 55. The steam and vapors in space 43 flow countercurrent to the flow of absorbent through the six sections.

Per 1000 cubic feet actual coke-oven gas volume, 550 cubic feet are generated by boiling in each of the six sections of the boiling chamber.

The $H_2S$-content of each of the 550-cubic feet volumes of vapor is estimated at 90% of the amount that would be in equilibrium with the solution that leaves the corresponding section.

The flash-solution is sufficiently superheated in the inter-condenser and after-condenser so that 2530 cubic feet of vapor will flash off when the solution is sprayed into the boiling chamber.

Sufficient solution is pumped through the sprays in sections 45, 47, 49 of the boiling chamber to make the flows across the intermediate baffles essentially zero.

Each spray is estimated to have a capacity of 0.3 transfer unit, with the exception of the group of foul solution sprays in the vapor line which is estimated at 0.4 transfer unit, that is, the average of liquid-phase and gas-phase transfer units.

The following tabulation shows the comparison in the sizes of equipment required for this present proposed system and the system as heretofore used in employing the process of my aforesaid Patent No. 2,464,805:

*Comparative Sizes of Equipment Required*

|  | Pat. No. 2,464,805 10-Plate Actifier | Actifier Design Disclosed Herein |
|---|---|---|
| Actifier Column | One required, 10-Plate column, 9'0" dia. x 47'0" high. | None used. |
| Boiling Chamber | Lower part of actifier serves this purpose. | One required, 6'0" dia. x 18'0" long. |
| Flash Solution Heat Exchanger. | Two required, each with 2,800 sq. ft. or a total of 5,600 sq. ft. heating surface. | None used. 1,300 sq. ft. surface of tube nest in boiling chamber serves this purpose. |
| Vapor Condenser | 10,500,000 B.t.u./hr | 12,000,000 B.t.u./hr. |
| Solution Cooler | 10,500 000 B.t.u./hr | 8,300,000 B.t.u./hr. |
| Load on Cooling Tower. | 21,000 000 B.t.u./hr | 20,000,000 B.t.u./hr. |
| Flash Solution Pump | 129,000 gal./hr | 26,000 gal./hr. |
| Actified and Foul Solution Pumps. | Same in both designs | Same in both designs. |
| Recirculating Pumps to Spray-nozzles. | None used | 3 at 26,000 gal. hr. |
| Steam-jet Ejectors | Same in both designs | Same in both designs. |

It will be further understood that the invention in all its aspects is not limited to the specific temperature for the liquor and gas and the specific pressures above-enumerated by way of exemplification of the best mode of practicing the invention at the time of filing this application.

The invention as herein-above-described is embodied in particular form and manner but may be variously embodied within the scope of the claims hereinafter made.

I claim:

1. In a process for the separation and recovery of hydrogen sulphide from coke oven gas, which comprises: scrubbing the coke oven gas in an absorption zone with an alkaline liquor to absorb hydrogen sulphide of the gas, actifying the fouled absorbent in an actification zone under subatmospheric pressure by indirect heat exchange with hot flushing liquor effluent of a collecting main of a coke oven battery to thereby raise the temperature of the absorbent in the actification zone to a temperature above 45° C. at which vapors are generated from the fouled absorbent which liberate therefrom gases including the absorbed hydrogen sulphide, and removing the vapors containing hydrogen sulphide from the actification zone by passing them through a vapor condensing zone and recycling the actified absorbent back to the absorption zone for further scrubbing of the gas, the improvement comprising, passing the fouled solution successively through a plurality of boiling sections in the actification zone with a vapor off-flow free space above the liquid in each section, flowing the vapors from the vapor space above the liquor in each subsequent section through the vapor space in a next preceding section, and thence, passing them to the vapor condensing zone, introducing the fouled absorbent from the absorbent zone to the actification zone by first spraying the same into the vapors passing to the vapor condensing zone to release hydrogen sulphide, collecting said spray and respraying it directly into the vapor space above the liquor in the first section of the actification zone, withdrawing absorbent liquor from each of a plurality of the preceding sections and respraying it into the vapor space above the liquor in a next subsequent section, and withdrawing absorbent liquor from a subsequent section of the actification zone and flash evaporating such withdrawn liquor into the vapor space above the liquor in a subsequent section of the actification zone.

2. In a process for the separation and recovery of hydrogen sulphide from coke oven gas, which comprises: scrubbing the coke oven gas in an absorption zone with an alkaline liquor to absorb hydrogen sulphide of the gas, actifying the fouled absorbent in an actification zone under subatmospheric pressure by indirect heat exchange with hot flushing liquor effluent of a collecting main of a coke oven battery to thereby raise the temperature of the absorbent in the actification zone to a temperature above 45° C. at which vapors are generated from the fouled absorbent which liberate therefrom gases including the absorbed hydrogen sulphide, and removing the vapors containing hydrogen sulphide from the actification zone by passing them through a vapor condensing zone and recycling the actified absorbent back to the absorption zone for further scrubbing of gas, the improvement comprising, passing the fouled solution successively through a plurality of boiling sections in the actification zone with a vapor off-flow free space above the liquor in each section, flowing the vapors from the vapor space above the liquor in each subsequent section through the vapor space in a next preceding section, and thence, passing them to the vapor condensing zone, introducing the fouled absorbent from the absorption zone to the actification zone by first spraying the same into the vapors passing to the vapor condensing zone to release hydrogen sulphide, collecting said spray and respraying it directly into the vapor space above the liquor in the first section of the actification zone, withdrawing absorbent liquor from each of a plurality of the preceding sections and respraying it into the vapor space above the liquor in a next subsequent section, withdrawing absorbent liquor from a subsequent section of the actification zone and flash evaporating such withdrawn liquor into the vapor space above the liquor in a subsequent section of the actification zone, injecting steam through jet evacuating means in communication, through said vapor condenser zone, with the fouled solution in the actification zone during its actification as aforesaid to maintain said subatmospheric pressure therein and producing within said jet evacuating means a mixture of steam and actifier vapors and thereby removing the liberated hydrogen sulphide from said actification zone, and bringing the absorbent from the subsequent stage of the actification zone that is to be flash evaporated as aforesaid into indirect contact with the steam actifier vapor mixture from the jet evacuating means, to absorb heat therefrom for return to the absorbent in the actification zone and release of hydrogen sulphide during its flash evaporation as aforesaid.

3. A process as claimed in claim 1, and which includes the steps of flowing the fouled absorbent from the absorption zone in heat exchange relation with the actified absorbent from the actification zone to cool the latter before its return to the absorption zone and preheating the fouled absorbent before its discharge as spray into the vapor line from the actification zone.

References Cited in the file of this patent
UNITED STATES PATENTS

| | | |
|---|---|---|
| 2,379,076 | Gollmar | June 26, 1945 |
| 2,464,805 | Gollmar | Mar. 22, 1949 |
| 2,842,423 | Gollmar | July 8, 1958 |
| 2,886,405 | Benson et al. | May 12, 1959 |